United States Patent
Hibino

(10) Patent No.: US 10,926,585 B2
(45) Date of Patent: Feb. 23, 2021

(54) TIRE WITH TIE BARS

(71) Applicant: Sumitomo Rubber Industries, Ltd., Kobe (JP)

(72) Inventor: Atsushi Hibino, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 184 days.

(21) Appl. No.: 15/719,044

(22) Filed: Sep. 28, 2017

(65) Prior Publication Data

US 2018/0086152 A1 Mar. 29, 2018

(30) Foreign Application Priority Data

Sep. 29, 2016 (JP) .............................. JP2016-191760

(51) Int. Cl.
*B60C 11/13* (2006.01)
*B60C 11/03* (2006.01)
*B60C 11/11* (2006.01)

(52) U.S. Cl.
CPC ...... *B60C 11/1369* (2013.01); *B60C 11/0302* (2013.01); *B60C 11/0306* (2013.01); *B60C 11/0318* (2013.01); *B60C 11/11* (2013.01); *B60C 2011/0344* (2013.01); *B60C 2011/0348* (2013.01); *B60C 2011/0353* (2013.01); *B60C 2011/0355* (2013.01)

(58) Field of Classification Search
CPC .................................................. B60C 11/1369
See application file for complete search history.

(56) References Cited

U.S. PATENT DOCUMENTS 3,727,661 A * 4/1973 Hoke ................... B60C 11/032
152/209.22
4,353,402 A * 10/1982 Burche ................ B29D 30/66
152/209.22

(Continued)

FOREIGN PATENT DOCUMENTS

EP 0609194 A 8/1994
EP 1619050 A1 1/2006

(Continued)

OTHER PUBLICATIONS

Extended European Search Report, dated Feb. 5, 2018, for European Application No. 17192185.1.

*Primary Examiner* — Timothy Kennedy
*Assistant Examiner* — Alexander A Wang
(74) *Attorney, Agent, or Firm* — Birch, Stewart, Kolasch & Birch, LLP

(57) ABSTRACT

A tire comprises a tread portion provided with a first middle main groove, a second middle main groove, a crown longitudinal groove disposed between the first middle main groove and the second middle main groove, first crown lateral grooves connecting between the crown longitudinal groove and second middle main groove, and second crown lateral grooves connecting between the crown longitudinal groove and the second middle main groove. The first crown lateral grooves and the second crown lateral grooves are arranged so as to be misaligned with each other in the tire circumferential direction. The crown longitudinal groove is provided with at least one crown tie bar formed by raising a groove bottom of the crown longitudinal groove.

17 Claims, 7 Drawing Sheets

(56) References Cited

U.S. PATENT DOCUMENTS

| | | | | |
|---|---|---|---|---|
| 5,115,850 | A * | 5/1992 | Crump | B60C 11/00 |
| | | | | 152/209.22 |
| 5,256,221 | A * | 10/1993 | Trabandt | B60C 11/11 |
| | | | | 152/209.22 |
| 8,733,411 | B2 * | 5/2014 | Mukai | B60C 11/0302 |
| | | | | 152/209.21 |
| 2014/0130952 | A1 * | 5/2014 | Tanaka | B60C 11/1315 |
| | | | | 152/209.24 |
| 2014/0238568 | A1 * | 8/2014 | Haga | B60C 11/0306 |
| | | | | 152/209.18 |
| 2014/0246134 | A1 * | 9/2014 | Hironaka | B60C 11/24 |
| | | | | 152/154.2 |
| 2015/0083306 | A1 * | 3/2015 | Colby | B60C 11/1369 |
| | | | | 156/96 |
| 2016/0221397 | A1 * | 8/2016 | Maehara | B60C 11/0306 |
| 2017/0028790 | A1 * | 2/2017 | Shmagranoff | B60C 11/047 |

FOREIGN PATENT DOCUMENTS

| | | | | |
|---|---|---|---|---|
| EP | 3023269 A1 | 5/2016 | | |
| JP | 2014-125109 A | 7/2014 | | |
| WO | WO-2015050022 A1 * | 4/2015 | | B60C 11/0306 |

* cited by examiner

TIRE WITH TIE BARS

TECHNICAL FIELD

The present invention relates to a tire capable of improving noise performance and wet performance in a good balance.

BACKGROUND ART

In recent years, there has been a demand for a tire having improved wet performance which is steering stability on a wet road as well as steering stability on a dry road. Thereby, for example, a tire has been proposed in which the wet performance is improved by smoothly discharging water film between a tread portion and a road surface by increasing volume of a lateral groove provided in the tread portion.

However, in a tire provided with the lateral groove having large volume, pattern rigidity of the tread portion is decreased. Thereby, when the tread portion of the tire is in contact with ground, deformation of the lateral groove is increased and thus pumping sound generated by narrowing and widening of the lateral groove is large, therefore, it is possible that the noise performance is deteriorated.

SUMMARY OF THE INVENTION

The present invention was made in view of the above, and a primary object thereof is to provide a tire capable of improving the noise performance and the wet performance by improving a crown lateral groove and a crown longitudinal groove.

In one aspect of the present invention, a tire comprises a tread portion provided with a first middle main groove extending continuously in a tire circumferential direction, a second middle main groove extending continuously in the tire circumferential direction, a crown longitudinal groove extending continuously in the tire circumferential direction and disposed between the first middle main groove and the second middle main groove, a plurality of first crown lateral grooves connecting between the crown longitudinal groove and the first middle main groove, and a plurality of second crown lateral grooves connecting between the crown longitudinal groove and the second middle main groove, wherein the first crown lateral grooves and the second crown lateral grooves are arranged so as to be misaligned with each other in the tire circumferential direction, and the crown longitudinal groove is provided with at least one crown tie bar formed by raising a groove bottom of the crown longitudinal groove.

In another aspect of the invention, it is preferred that the first crown lateral grooves and the second crown lateral grooves are arranged with same pitches and shifted by half-pitches in the tire circumferential direction.

In another aspect of the invention, it is preferred that the at least one crown tie bar is disposed between a connecting position of one of the first crown lateral grooves with the crown longitudinal groove and a connecting position of adjacent one of the second lateral grooves with the crown longitudinal groove.

In another aspect of the invention, it is preferred that the at least one crown tie bar includes a first crown tie bar having a first depth and a second crown tie bar having a second depth greater than the first depth of the first crown tie bar.

In another aspect of the invention, it is preferred that the first depth is in a range of from 45% to 75% of the second depth.

In another aspect of the invention, it is preferred that the first middle main groove and the second middle main groove are provided with middle tie bars formed by raising groove bottoms of the first middle main groove and the second middle main groove.

In another aspect of the invention, it is preferred that the tread portion is provided with a first shoulder main groove extending continuously in the tire circumferential direction on the outer side in a tire axial direction of the first middle main groove and a plurality of first middle lateral grooves connecting between the first shoulder main groove and the first middle main groove, and each of the middle tie bars of the first middle main groove is disposed between a connecting position of one of the first crown lateral grooves with the first middle main groove and a connecting position of adjacent one of the first middle lateral grooves with the first middle main groove.

In another aspect of the invention, it is preferred that the tread portion is provided with a second shoulder main groove extending continuously in the tire circumferential direction on the outer side in the tire axial direction of the second middle main groove, and the first shoulder main groove and the second shoulder main groove are provided with shoulder tie bars formed by raising groove bottoms of the first shoulder main groove and the second shoulder main groove.

In another aspect of the invention, it is preferred that the tread portion is provided with a plurality of first shoulder lateral grooves connecting between the first shoulder main groove and one of tread edges adjacent thereto, and each of the shoulder tie bars of the first shoulder main groove is disposed between a connecting position of one of the first middle lateral grooves with the first shoulder main groove and a connecting position of adjacent one of the first shoulder lateral grooves with the first shoulder main groove.

DESCRIPTION OF THE PREFERRED EMBODIMENT

An embodiment of the present invention will now be described in conjunction with accompanying drawings.

Figure 1:
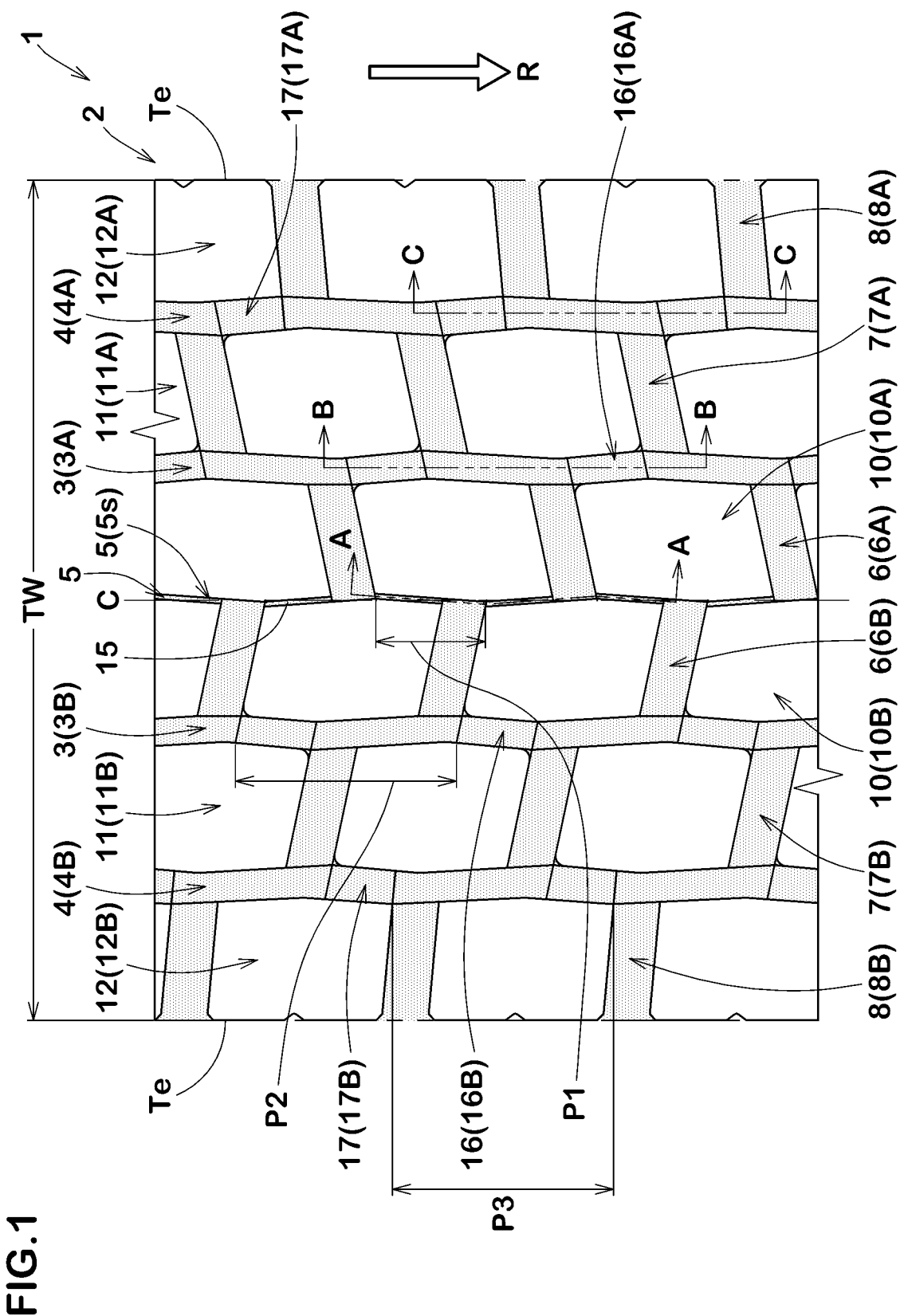
FIG. 1 is a development view of a tread portion as an embodiment of the present invention.

FIG. 1 is a development view of a tread portion 2 of a tire 1 as an embodiment of the present invention. The present invention can be used for various tires such as pneumatic tires for passenger cars, motorcycles and the like, and non-pneumatic tires which are not filled with pressurized air, for example. The tire 1 shown in FIG. 1 is a pneumatic tire for heavy duty.

The tire 1 in this embodiment has a predetermined rotational direction (R). In this specification, the tire 1 rotates in a direction indicated by an arrow. The rotational direction (R) is indicated on a sidewall portion (not shown), for example, as letters or the like.

The tread portion 2 is provided with a pair of middle main grooves 3, a pair of shoulder main grooves 4 and a crown longitudinal groove 5 extending continuously in a tire circumferential direction. In this specification, regarding a groove extending continuously in the tire circumferential direction, a groove having a groove width not less than 3 mm is referred to as a main groove, and a groove having a groove width less than 3 mm is referred to as a longitudinal groove.

The middle main grooves 3 in this embodiment include a first middle main groove 3A arranged on one side in a tire axial direction (right side in FIG. 1) of a tire equator (c) and a second middle main groove 3B arranged on the other side in the tire axial direction (left side in FIG. 1).

The shoulder main grooves 4 in this embodiment include a first shoulder main groove 4A arranged on an outer side in the tire axial direction of the first middle main groove 3A and a second shoulder main groove 4B arranged on the outer side in the tire axial direction of the second middle main groove 3B. The crown longitudinal groove 5 in this embodiment is provided between the first middle main groove 3A and the second middle main groove 3B.

By the main grooves 3 to 5, the tread portion 2 is provided with crown land regions 10, middle land regions 11, and shoulder land regions 12.

The crown land regions 10 include a first crown land region 10A defined between the crown longitudinal groove 5 and the first middle main groove 3A, and a second crown land region 10B defined between the crown longitudinal groove 5 and the second middle main groove 3B.

The middle land regions 11 include a first middle land region 11A defined between the first middle main groove 3A and the first shoulder main groove 4A, and a second middle land region 11B defined between the second middle main groove 3B and the second shoulder main groove 4B.

The shoulder land regions 12 include a first shoulder land region 12A defined between the first shoulder main groove 4A and a first tread edge (Te), and a second shoulder land region 12B defined between the second shoulder main groove 4B and a second tread edge (Te).

Further, the tread portion 2 is provided with crown lateral grooves 6, middle lateral grooves 7, and shoulder lateral grooves 8.

The crown lateral grooves 6 in this embodiment include first crown lateral grooves 6A each connecting between the crown longitudinal groove and the first middle main groove 3A, and second crown lateral grooves 6B each connecting between the crown longitudinal groove 5 and the second middle main groove 3B.

The middle lateral grooves 7 in this embodiment include first middle lateral grooves 7A each connecting between the first middle main groove 3A and the first shoulder main groove 4A, and second middle lateral grooves 7B each connecting between the second middle main groove 3B and the second shoulder main groove 4B.

The shoulder lateral grooves 8 in this embodiment include first shoulder lateral grooves 8A each connecting between the first shoulder main groove 4A and the first tread edge (Te), and second shoulder lateral grooves 8B each connecting between the second shoulder main groove 4B and the second tread edge (Te).

The "tread edges" (Te) are defined as axially outermost ground contacting positions of the tire 1 when the tire 1 in a standard state mounted on a standard rim and inflated to a standard pressure with no tire load. The axially outermost ground contacting positions are defined on a state when the tire being in the standard state is in contact with a flat surface with zero camber angles by being loaded with a standard tire load. A "tread width" (Tw) is defined as a distance in the tire axial direction between the tread edges (Te). Sizes and the like of various parts of the tire are those measured in the standard state unless otherwise noted.

The "standard rim" is a wheel rim specified for the concerned tire by a standard included in a standardization system on which the tire is based, for example, the "normal wheel rim" in JATMA, "Design Rim" in TRA, and "Measuring Rim" in ETRTO.

The "standard pressure" is air pressure specified for the concerned tire by a standard included in a standardization system on which the tire is based, for example, the "maximum air pressure" in JATMA, maximum value listed in the "TIRE LOAD LIMITS AT VARIOUS COLD INFLATION PRESSURES" table in TRA, and "INFLATION PRESSURE" in ETRTO.

The "standard load" is a tire load specified for the concerned tire by a standard included in a standardization system on which the tire is based, for example, the "maximum load capacity" in JATMA, maximum value listed in "TIRE LOAD LIMITS AT VARIOUS COLD INFLATION PRESSURES" table in TRA, and "LOAD CAPACITY" in ETRTO.

The crown longitudinal groove 5 in this embodiment extends in a zigzag manner in the tire circumferential direction. Further, the crown longitudinal groove 5 is provided on the tire equator (C). Thereby, water film under the tire equator C, which is most difficult to drain, is discharged smoothly, therefore, the wet performance is improved.

The crown longitudinal groove 5 is provided with at least one crown tie bar 15, a plurality of crown tie bars 15 in this embodiment, formed by raising groove bottom (5s). Thereby, rigidity of the crown land regions 10 is increased, therefore, deformation of the first crown lateral grooves 6A and the second crown lateral grooves 6B upon contacting with the ground is decreased. Thereby, the pumping sound generated by narrowing and widening of the grooves is suppressed, therefore, the noise performance is improved. In this specification, "groove bottom" means deepest part of groove.

Each of the crown tie bars 15 is provided in a portion of the crown longitudinal groove 5 between one of connecting positions of the first crown lateral grooves 6A with the crown longitudinal groove 5 and its adjacent one of connecting positions of the second crown lateral grooves 6B with the crown longitudinal groove 5. The crown tie bars 15 configured as such increase the rigidity of the first crown land region 10A and the second crown land region 10B so as to suppress collapse, therefore, it is possible that the pumping sound is further suppressed. Each of the crown tie bars 15 in this embodiment is formed over an entire length of the crown longitudinal groove 5 between one of the first crown lateral grooves 6A and its adjacent one of the second crown lateral grooves 6B.

Figure 2:
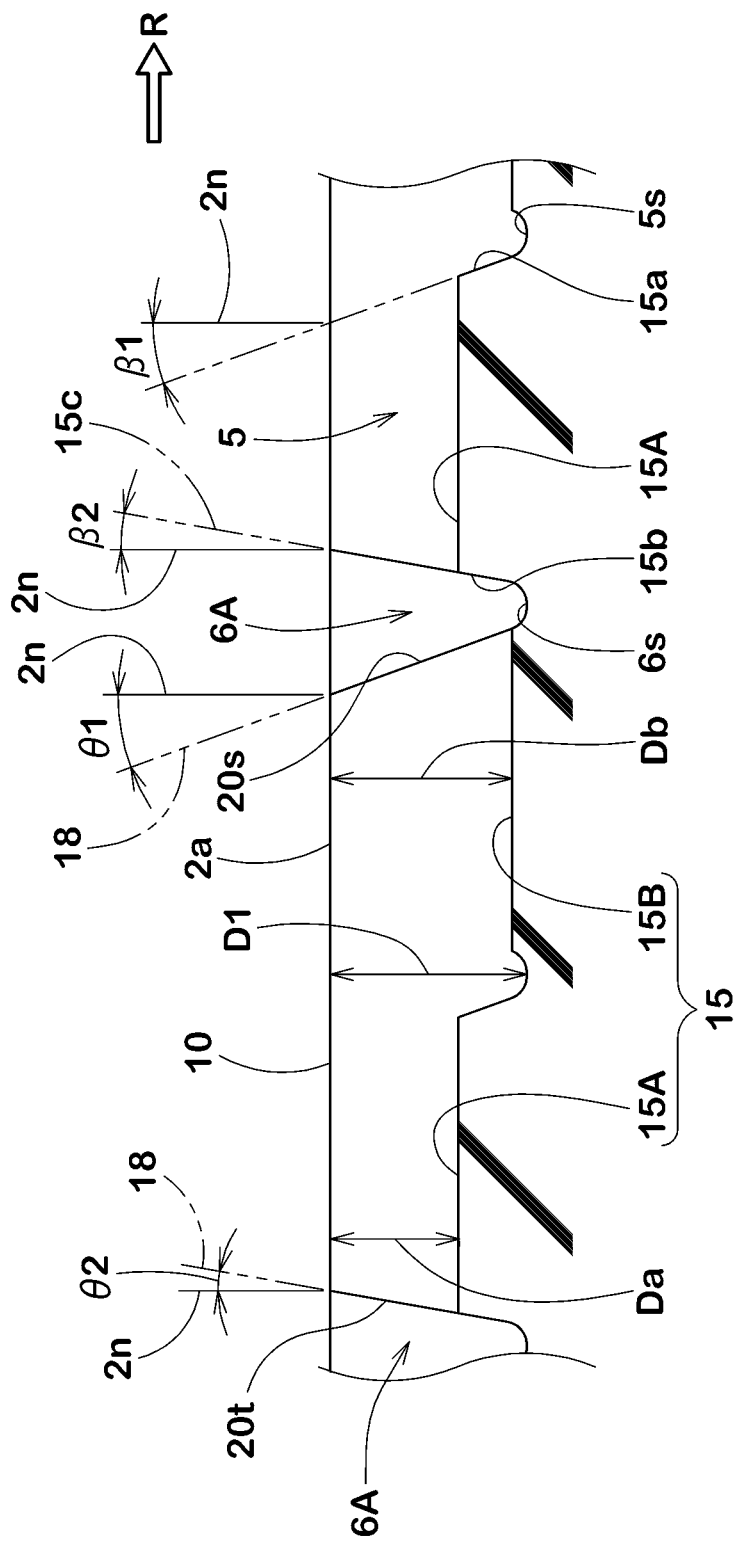
FIG. 2 is a cross-sectional view taken along A-A line of FIG. 1.

As shown in FIG. 2, the crown tie bars 15 in this embodiment include first crown tie bars 15A having first depths (Da) and second crown tie bars 15B having second depths (Db) larger than the first depths (Da). The first crown tie bars 15A more surely suppress the collapse of the first crown land region 10A and the second crown land region 10B. The second crown tie bars 15B maintain drainage performance high.

It is preferred that the first depths (Da) are in a range of from 45% to 75% of the second depths (Db). If the first depths (Da) are less than 45% of the second depths (Db), groove volume of the crown longitudinal groove 5 is decreased, therefore, it is possible that the drainage performance is deteriorated. If the first depths (Da) are greater than 75% of the second depths (Db), it is possible that the collapse of the first crown land region 10A and the second crown land region 10B is increased. Thereby, it is possible not only that uneven wear resistance performance is deteriorated but also that the pumping sound is increased. It is preferred that the second depths (Db) are in a range of about 85% to about 95% of maximum depths D1 of the crown longitudinal groove 5.

Each of the first crown tie bar 15A is provided with a heel-side edge (15a) including a heel-side end in the rotational direction (R) and extending from the groove bottom (5s) outwardly in a tire radial direction, and a toe-side edge (15b) including a toe-side end in the rotational direction (R) and extending radially outwardly from the groove bottom (5s). It is preferred that inclination angles β1 of the heel-side edges (15a) are greater than inclination angles β2 of the toe-side edges (15b). Thereby, it is possible that water in the groove flows smoothly to the toe-side in the rotational direction (R). The inclination angles of the heel-side edge (15a) and the toe-side edge (15b) are angles between imaginary lines (15c) obtained by extending the heel-side edge and the toe-side edge smoothly radially outwardly and normal lines (2n) with respect to a ground contacting surface (2a) at positions where the ground contacting surface (2a) intersects with the imaginary lines 15c, respectively. Inclination angles of a heel-side edge (16a) and a toe-side edge (16b) of a middle tie bar 16 and inclination angles of a heel-side edge (17a) and a toe-side edge (17b) of a shoulder tie bar 17 described later are defined in the same way.

In order to suppress the deterioration of the wet performance while increasing the rigidity of the crown land regions 10, it is preferred that the inclination angles β1 of the heel-side edges (15a) are in a range of from 10 to 30 degrees. It is preferred that the inclination angles β2 of the toe-side edges (15b) are in a range of from 5 to 20 degrees.

Figure 3:
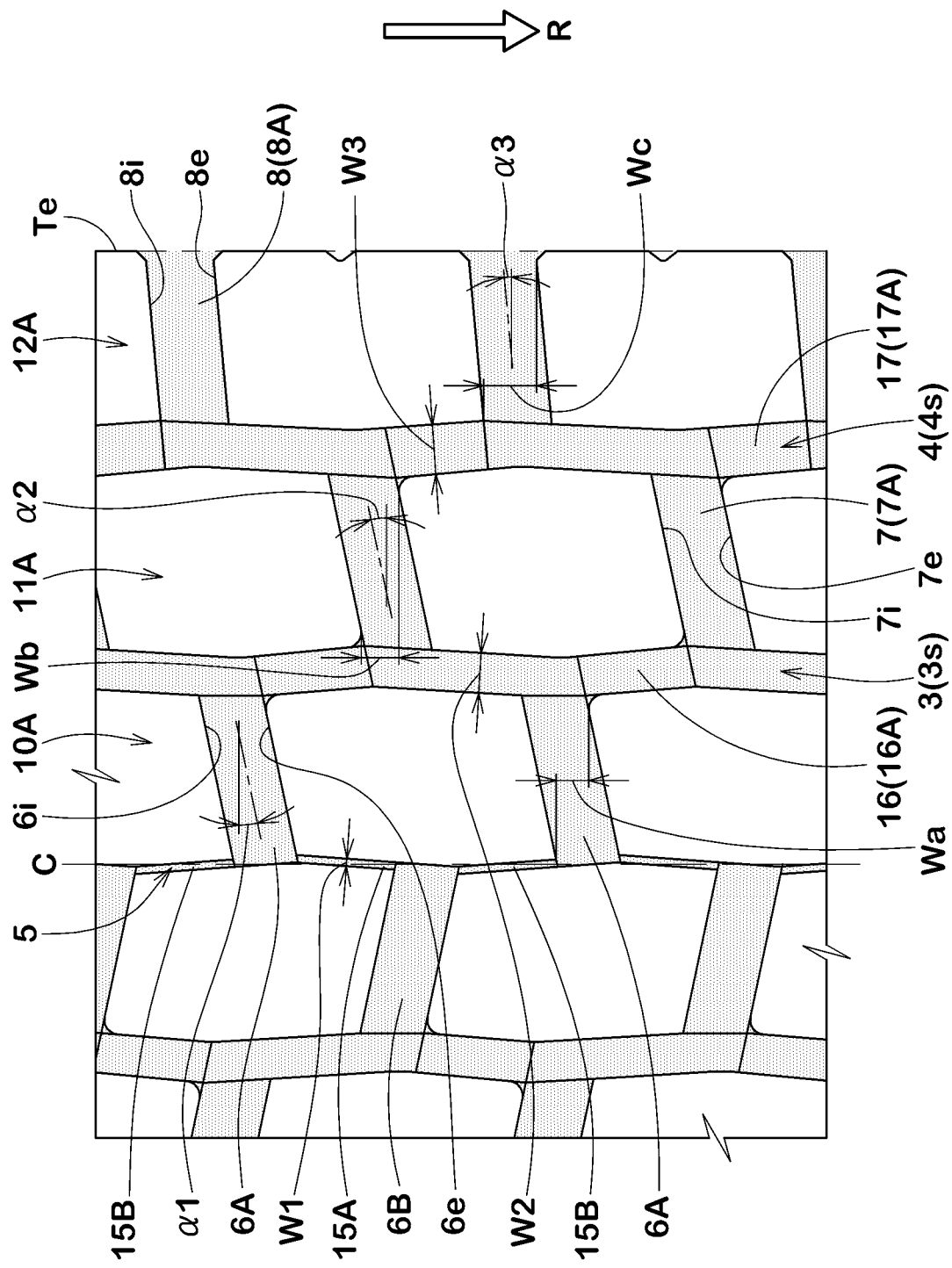
FIG. 3 is an enlarged view of a right half of the tread portion of FIG. 1.

As shown in FIG. 3, each of the first crown tie bars 15A in this embodiment is provided in the crown longitudinal groove 5 at a position between one of the second crown lateral grooves 6B and its adjacent one of the first crown lateral grooves 6A on the toe-side in the rotational direction (R). Each of the second crown tie bars 15B is provided in the crown longitudinal groove 5 at a position between one of the second crown lateral grooves 6B and its adjacent one of the first crown lateral grooves 6A on the heel-side in the rotational direction (R). In this way, the first crown tie bars 15A and the second crown tie bars 15B in this embodiment are arranged alternately in the tire circumferential direction.

The middle main grooves 3 and the shoulder main grooves 4 in this embodiment extend in a zigzag manner in the tire circumferential direction. The main grooves 3 and 4 configured as such effectively collect water between a ground contacting surface of each of the land regions 10 to 12 during running on a wet road surface, therefore, the wet performance is improved. The middle main grooves 3 and the shoulder main grooves 4 are not limited to such a configuration, and may be configured so as to extend in a sine wave shape or a straight line, for example.

The middle main grooves 3 in this embodiment are provided with middle tie bars 16 formed by raising groove bottoms (3s). The middle tie bars 16 include first middle tie bars 16A provided in the first middle main groove 3A and second middle tie bars 16B (shown in FIG. 1) provided in the second middle main groove 3B.

The middle tie bars 16 in this embodiment are provided in portions of the middle main grooves 3 between connecting positions of the crown lateral grooves 6 with the middle main grooves 3 and connecting positions of the middle lateral grooves 7 with the middle main grooves 3. Each of the middle tie bars 16 in this embodiment is formed over an entire length of a portion of the middle main groove 3 between one of the crown lateral grooves 6 and its adjacent one of the middle lateral grooves 7 on the heel-side. Thereby, the rigidity of the crown land regions 10 and the middle land regions 11 is increased, therefore, the collapse of the land regions 10 and 11 is suppressed, thereby, the pumping sound generated in the crown lateral grooves 6 and the middle lateral grooves 7 is further decreased.

Figure 4:
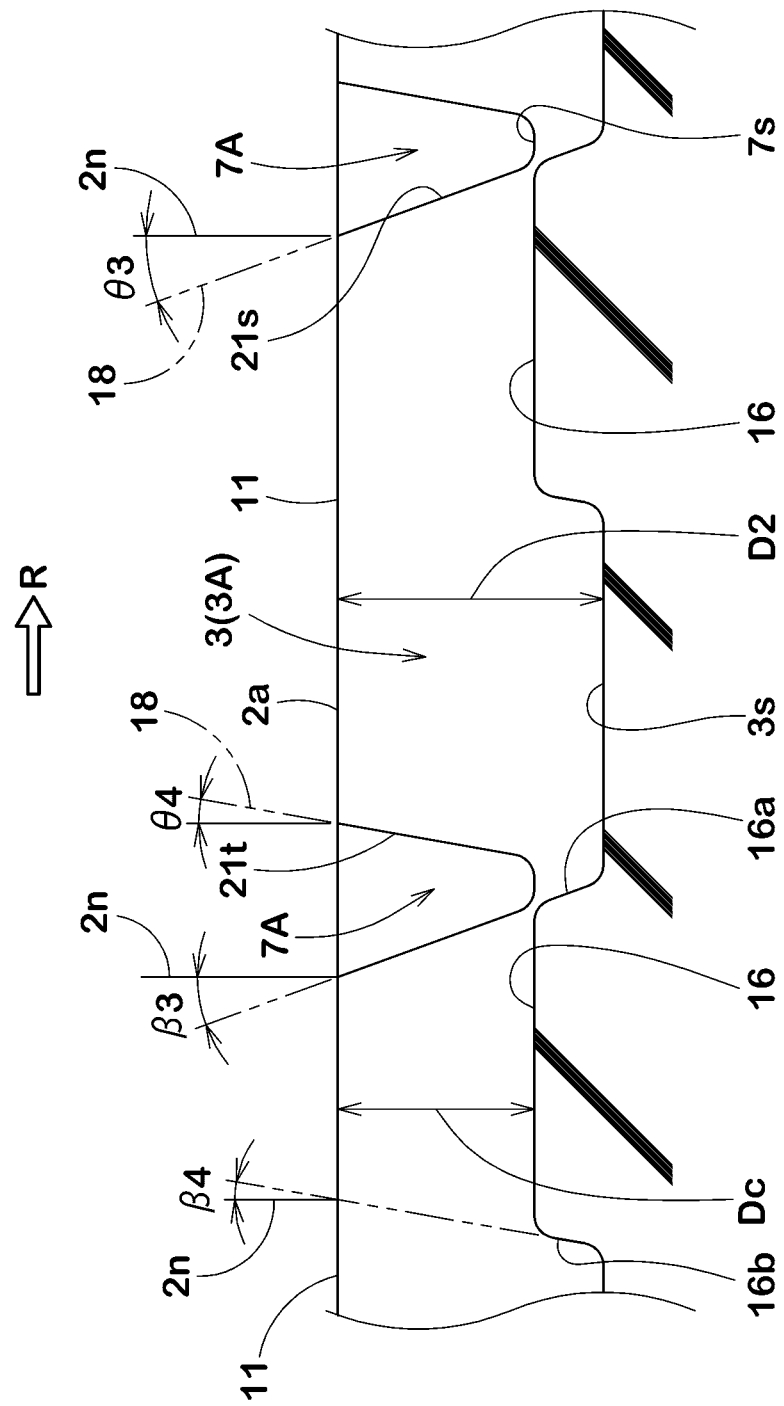
FIG. 4 is a cross-sectional view taken along B-B line of FIG. 1.

As shown in FIG. 4, it is preferred that depths (Dc) of the middle tie bars 16 are in a range of from 60% to 80% of groove depths P2 of the middle main grooves 3. Thereby, the wet performance and the noise performance are improved in a good balance.

Each of the middle tie bar 16 is provided with a heel-side edge (16a) including a hell-side end thereof in the rotational direction (R) and extending radially outwardly from the groove bottom (3s) and a toe-side edge (16b) including a toe-side end thereof in the rotational direction (R) and extending radially outwardly from the groove bottom (3s). It is preferred that inclination angles β3 of the heel-side edges (16a) are larger than inclination angles β4 of the toe-side edges (16b). Thereby, it is possible that water in the grooves smoothly flows to the toe-side in the rotational direction (R). In order to suppress deterioration of the wet performance while increasing the rigidity of the crown land regions 10 and the middle land regions 11, it is preferred that the inclination angles β3 of the heel-side edges (16a) are in a range of from 10 to 30 degrees. It is preferred that the inclination angles β4 of the toe-side edges (16b) are in a range of from 5 to 20 degrees.

As shown in FIG. 1, pitches P2 in the tire circumferential direction of the middle tie bars 16 in this embodiment is twice as large as pitches P1 in the tire circumferential direction of the crown tie bars 15. Thereby, it is possible that the rigidity is greatly increased in the crown land regions 10 to which large ground contact pressure is applied, therefore, the uneven wear resistance performance and the noise performance are improved.

Figure 5:
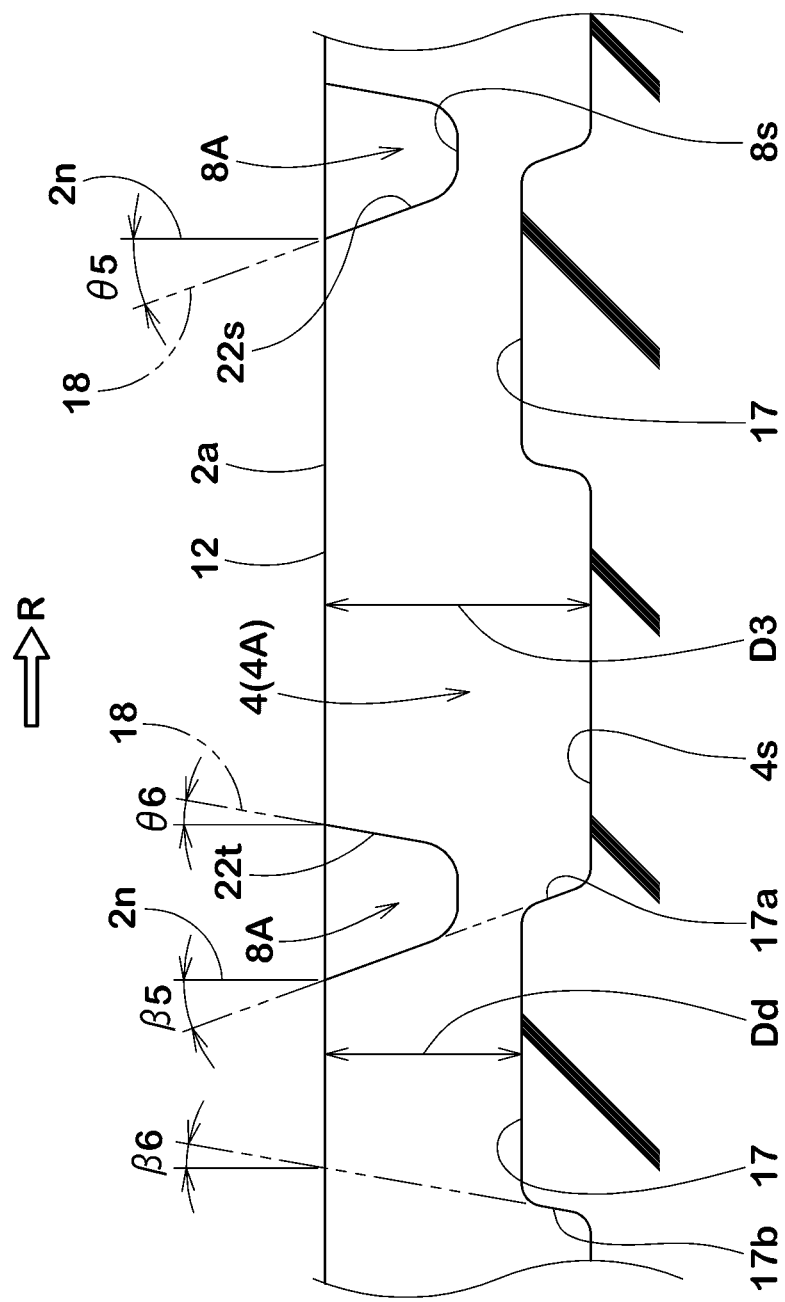
FIG. 5 is a cross-sectional view taken along C-C line of FIG. 1.

The shoulder main grooves 4 in this embodiment are provided with shoulder tie bars 17 formed by raising groove bottoms (4s) shown in FIG. 5. The shoulder tie bars 17 include first shoulder tie bars 17A provided in the first shoulder main groove 4A and second shoulder tie bars 17B provided in the second shoulder main groove 4B.

The shoulder tie bars 17 in this embodiment are provided in portions of the shoulder main grooves 4 between connecting positions of the middle lateral grooves 7 with the shoulder main grooves 4 and connecting positions of the shoulder lateral grooves 8 with the shoulder main grooves 4. Each of the shoulder tie bars 17 in this embodiment is formed over an entire length of a portion of the shoulder main groove 4 between one of the middle lateral grooves 7 and its adjacent one of the shoulder lateral grooves 8 on the heel-side in the rotational direction (R). Thereby, the rigidity of the shoulder land regions 12 and the middle land regions 11 is increased, thus, the collapse of the land regions 12 and 11 is suppressed, therefore, the pumping sound generated in the shoulder lateral grooves 8 and the middle lateral grooves 7 is further decreased.

Pitches P3 in the tire circumferential direction of the shoulder tie bars 17 is the same as the pitches P2 of the middle tie bars 16. Thereby, the drainage performance of the shoulder main grooves 4 and the middle main grooves 3 is maintained high.

As shown in FIG. 5, it is preferred that depths (Dd) of the shoulder tie bars 17 is in a range of from 60% to 80% of groove depths D3 of the shoulder main grooves 4.

Each of the shoulder tie bars 17 is provided with a heel-side edge (17a) including a heel-side end thereof in the rotational direction (R) and extending radially outwardly from the groove bottom (4s) and a toe-side edge (17b) including a toe-side end thereof in the rotational direction (R) and extending radially outwardly from the groove bottom (4s). It is preferred that an inclination angles β5 of the heel-side edges (17a) are larger than inclination angles β6 of the toe-side edges (17b). Thereby, it is possible that water in the grooves smoothly flows to the toe-side in the rotational direction (R). In order to suppress deterioration of the wet performance while increasing the rigidity of the shoulder land regions 12 and the middle land regions 11, it is preferred that the inclination angles β5 of the heel-side edges (17a) are in a range of from 10 to 30 degrees. It is preferred that the inclination angles β6 of the toe-side edges (17b) are in a range of from 5 to 20 degrees.

As just described above, the tie bars 15 to 17 in this embodiment are provided in the crown longitudinal groove 5 having a small groove width, the middle main grooves 3 and the shoulder main grooves 4 having large groove widths, respectively. Rotational force of the tire 1 is exerted on water in the main grooves and the longitudinal groove extending in the tire circumferential direction, therefore, for example, as compared with tie bars provided in lateral grooves extending in the tire axial direction, it is possible that the tie bars 15 to 17 in this embodiment let water flow smoothly. Thereby, the wet performance is greatly secured. Further, the rigidity of portions of the land regions in the vicinity of the tie bars 15 to 17 is increased, thereby, deformation due to narrowing and widening of each of the lateral grooves upon contacting with ground is suppressed, therefore, the pumping sound is decreased. Thereby, the wet performance and the noise performance of the tire 1 in this embodiment are greatly improved.

As shown in FIG. 3, it is preferred that groove widths W2 of the middle main grooves 3 are larger than a groove width W1 of the crown longitudinal groove 5. Thereby, the rigidity is increased in the crown land regions 10 to which large ground contact pressure is applied, therefore, anti-wear performance is improved.

In order to effectively exert the above described effects, it is preferred that the groove widths W2 of the middle main grooves 3 are smaller than groove widths W3 of the shoulder main grooves 4. It is preferred that the groove widths W2 of the middle main grooves 3 are in about a range of from 1.5% to 4.5% of the tread width (Tw). It is preferred that the groove widths W3 of the shoulder main grooves 4 are in about a range of from 2.0% to 5.0% of the tread width (Tw). It is preferred that the groove width W1 of the crown longitudinal groove 5 is in a range of from 0.5 to 2.0 mm.

The crown lateral grooves 6 in this embodiment extend straight. Thereby, water flows smoothly in the crown lateral grooves 6, therefore, the wet performance is improved.

The crown lateral grooves 6 are inclined with respect to the tire axial direction. Thereby, groove edges of the crown lateral grooves 6 gradually contacts the ground, therefore, the pumping sound is decreased. It is preferred that angles α1 of the crown lateral grooves 6 with respect to the tire axial direction are in a range of from 5 to 20 degrees. If the angles α1 of the crown lateral grooves 6 are less than 5 degrees, the groove edges of the crown lateral grooves 6 contact with the ground substantially at the same time, therefore, it is possible that the pumping sound is increased. If the angles α1 of the crown lateral grooves 6 are larger than 20 degrees, the rigidity of the crown land regions 10 in the vicinity of the crown lateral grooves 6 is decreased, therefore, it is possible that the anti-wear performance is deteriorated.

The first crown lateral grooves 6A and the second crown lateral grooves 6B are provided so as to be shifted, i.e. misaligned, with each other in the tire circumferential direction, in other words, they are arranged alternately so as to be misaligned with each other in the tire circumferential direction. Thereby, it is suppressed that the first crown lateral grooves 6A and the second crown lateral grooves 6B contact with the ground at the same time, therefore, the pumping sound is maintained small. Further, it is possible that the first crown lateral grooves 6A and the second crown lateral grooves 6B effectively discharge water film on the tire equator via the first middle main groove 3A and the second middle main groove 3B. Therefore, the wet performance and the noise performance are improved.

The first crown lateral grooves 6A and the second crown lateral grooves 6B in this embodiment are arranged with the same pitches and shifted, i.e. misaligned, by half-pitches in the tire circumferential direction, in other words, the first crown lateral grooves 6A and the second crown lateral grooves 6B in this embodiment are arranged alternately in the tire circumferential direction at half-pitches intervals. Thereby, timing of contacting the ground of the first crown lateral grooves 6A and the second crown lateral grooves 6B greatly deviates, therefore, the noise performance is further improved.

It is preferred that shortest distances (Wa) in the tire circumferential direction from heel-side groove edges (6e) to toe-side groove edges (6i) in the rotational direction (R) of the crown lateral grooves 6 are not greater than 15 mm. If the shortest distances (Wa) are greater than 15 mm, the rigidity of the crown land regions 10 is decreased, therefore, it is possible that the noise performance and the uneven wear resistance performance are deteriorated. If the shortest distances (Wa) are less than 0 mm, that is, toe-side ends in the rotational direction (R) of the heel-side groove edges (6e) are located on the toe-side of heel-side ends in the rotational direction (R) of the toe-side groove edges (6i), respectively, drainage resistance of the crown lateral grooves 6 is increased, therefore, it is possible that the wet performance is deteriorated. Note that a distance in a direction from the heel-side to the toe-side in the rotational direction (R) is defined as positive, and a distance in a direction from the toe-side to the heel-side in the rotational direction (R) is defined as negative. Therefore, if the shortest distances (Wa) are less than 0 mm, the heel-side groove edges (6e) and the toe-side groove edges (6i) overlap in the tire circumferential direction.

The first crown lateral grooves 6A are inclined in opposite directions to the second crown lateral grooves 6B with respect to the tire axial direction. Thereby, opposite lateral forces applied to the first crown lateral grooves 6A and the second crown lateral grooves 6B are canceled out. Therefore, the wet performance is improved.

The middle lateral grooves 7 in this embodiment extend straight. Thereby, water flows smoothly in the middle lateral grooves 7, therefore, the wet performance is improved.

The middle lateral grooves 7 are inclined with respect to the tire axial direction. Thereby, groove edges of the middle lateral grooves 7 gradually contacts the ground, therefore, the pumping sound is decreased. It is preferred that angles α2 of the middle lateral grooves 7 with respect to the tire axial direction are in a range of 5 to 20 degrees. If the angles α2 of the middle lateral grooves 7 are less than 5 degrees, the groove edges of the middle lateral grooves 7 contact with the ground substantially at the same time, therefore, it is possible that the pumping sound is increased. If the angles α2 of the middle lateral grooves 7 are larger than 20 degrees, the rigidity of the middle land regions 11 in the vicinity of the middle lateral grooves 7 is decreased, it is possible that the anti-wear performance is deteriorated.

It is preferred that absolute values |α2−α1| of differences between the angles α2 of the middle lateral grooves 7 and the angles α1 of the crown lateral grooves 6 are not greater than 5 degrees. Thereby, it is possible that difference in the rigidity in the tire axial direction between the middle land regions 11 and the crown land regions 10 is decreased, therefore, it is possible that high uneven wear resistance performance is maintained.

It is preferred that shortest distances (Wb) in the tire circumferential direction between heel-side groove edges (7e) and toe-side groove edges (7i) in the rotational direction (R) of the middle lateral grooves 7 are not greater than 15 mm. If the shortest distances (Wb) are greater than 15 mm, the rigidity of the middle land regions 11 is decreased, therefore, it is possible that the noise performance and the uneven wear resistance performance are deteriorated. If the shortest distances (Wb) are less than 0 mm, the drainage resistance of the middle lateral grooves 7 is increased, therefore, it is possible that the wet performance is deteriorated.

The first middle lateral grooves 7A are inclined in opposite directions to the second middle lateral grooves 7B with respect to the tire axial direction. Thereby, opposite lateral forces applied to the first middle lateral grooves 7A and the second middle lateral grooves 7B are canceled out. Therefore, the wet performance is improved.

The shoulder lateral grooves 8 in this embodiment extend straight. Thereby, water flows smoothly in the shoulder lateral grooves 8, therefore, the wet performance is improved.

The shoulder lateral grooves 8 are inclined with respect to the tire axial direction. Thereby, groove edges of the shoulder lateral grooves 8 gradually contacts the ground, therefore, the pumping sound is decreased. It is preferred that angles α3 of the shoulder lateral grooves 8 with respect to the tire axial direction are not greater than 10 degrees. If the angles α3 of the shoulder lateral grooves 8 are larger than 10 degrees, the rigidity is decreased in the shoulder land regions 12 to which a large lateral force is applied during cornering, therefore, it is possible that the anti-wear performance is deteriorated. Note that if the angles α3 of the shoulder lateral grooves 8 are small, the groove edges of the shoulder lateral grooves 8 contact with the ground substantially at the same time, therefore, it is possible that the pumping sound is increased. Thereby, it is further preferred that the angles α3 of the shoulder lateral grooves 8 are not less than 2 degrees.

It is preferred that shortest distances (Wc) in the tire circumferential direction between heel-side groove edges (8e) and toe-side groove edges (8i) in the rotational direction (R) are not greater than 15 mm. If the shortest distances (Wc) are greater than 15 mm, the rigidity of the shoulder land regions 12 is decreased, therefore, it is possible that the noise performance and the uneven wear resistance performance is deteriorated. If the shortest distances (Wc) are less than 0 mm, that is, if the heel-side groove edges (8e) and the toe-side groove edges (8i) overlap in the tire circumferential direction, the drain resistance of the shoulder lateral grooves 8 is increased, therefore, it is possible that the wet performance is deteriorated.

The first shoulder lateral grooves 8A are inclined in opposite directions to the second shoulder lateral grooves 8B with respect to the tire axial direction. Thereby, opposite lateral forces applied to the first shoulder lateral grooves 8A and the second shoulder lateral grooves 8B are canceled out. Therefore, the wet performance is improved.

Figure 6:
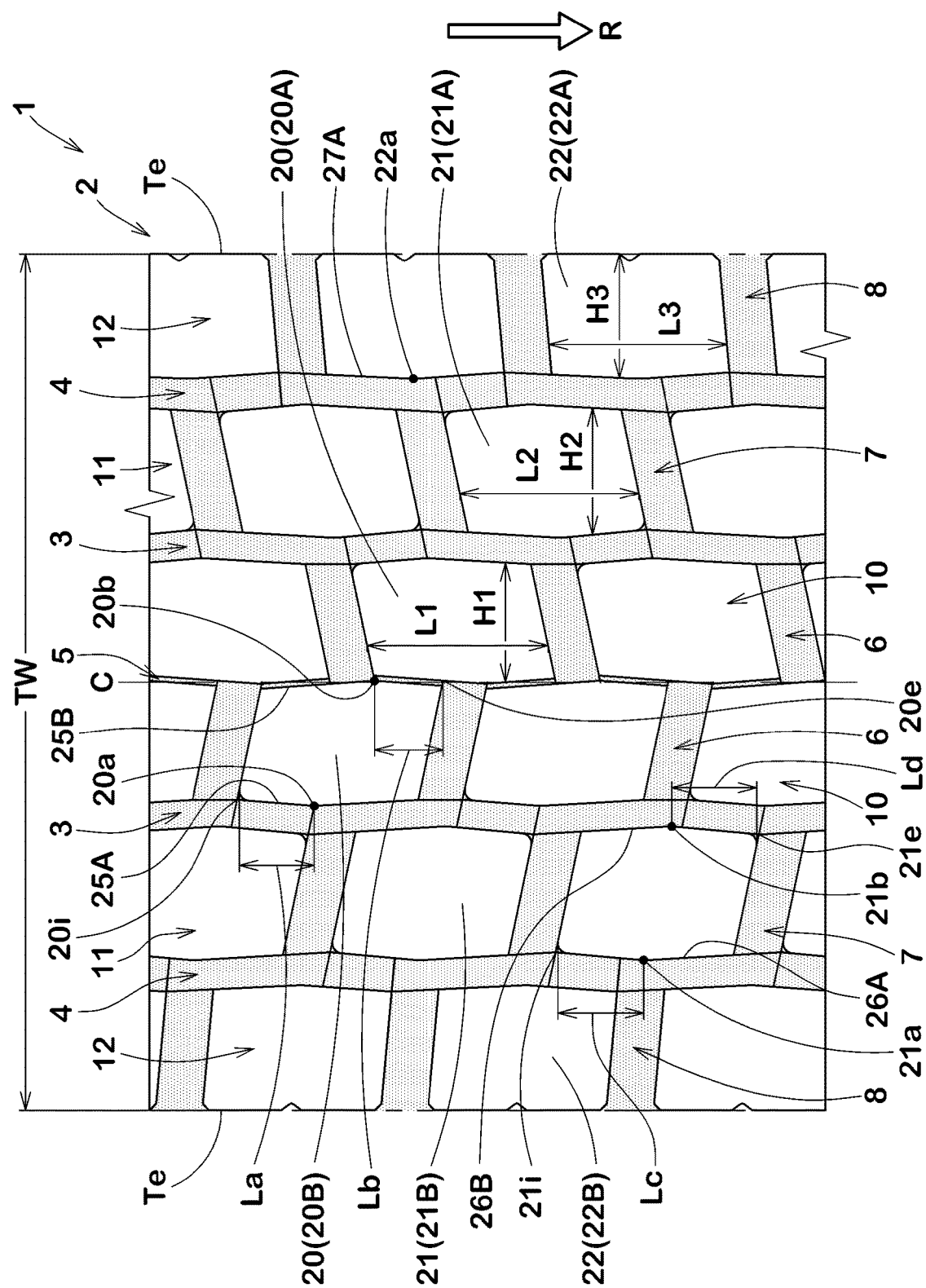
FIG. 6 is a development view of the tread portion as an embodiment of the present invention.

As shown in FIG. 6, in the crown land regions 10 in this embodiment, a plurality of crown blocks 20 each defined by the crown longitudinal groove 5, one of the middle main grooves 3, and a pair of adjacent crown lateral grooves 6 are arranged in the tire circumferential direction. In the middle land regions 11 in this embodiment, a plurality of middle blocks 21 each defined by one of the middle main grooves 3, its adjacent one of the shoulder main grooves 4, and a pair of adjacent middle lateral grooves 7 are arranged in the tire circumferential direction. In the shoulder land regions 12 in this embodiment, a plurality of the shoulder blocks 22 each defined by one of the shoulder main grooves 4, its adjacent one of the tread edges (Te), and a pair of adjacent shoulder lateral grooves 8 are arranged in the tire circumferential direction.

The crown blocks 20 in this embodiment include first crown blocks 20A provided in the first crown land region 10A and second crown blocks 20B provided in the second crown land region 10B. The middle blocks 21 in this embodiment include first middle blocks 21A provided in the first middle land region 11A and second middle blocks 21B provided in the second middle land region 11B. The shoulder blocks 22 in this embodiment include first shoulder blocks 22A provided in the first shoulder land region 12A and second shoulder blocks 22B provided in the second shoulder land region 12B. In this embodiment, each two of the blocks 20A to 22B adjacent to each other in the tire axial direction are arranged so as to be shifted, i.e. misaligned, by half pitches in the tire circumferential direction.

The crown blocks 20 in this embodiment have substantially hexagonal shapes in plan view. Each of the crown blocks 20 in this embodiment includes an outer block edge 25A extending in the tire circumferential direction on the outer side in the tire axial direction and an inner block edge 25B extending in the tire circumferential direction on an inner side in the tire axial direction. The outer block edge 25A has a central portion thereof in the tire circumferential direction protruding axially outwardly to form a crown outer top portion (20a). The inner block edge 25B has a central portion thereof in the tire circumferential direction protruding axially inwardly to form a crown inner top portion (20b). The crown blocks 20 configured as such disperse stress in the tire circumferential direction and moderate shearing strain with respect to the stress, therefore, they have high rigidity.

The crown outer top portion (20a) and the crown inner top portion (20b) are displaced in the tire circumferential direction. Thereby, change of tire axial width H1 of the crown block 20 over the tire circumferential direction is decreased, therefore, rigidity difference in the tire circumferential direction of the crown block 20 is decreased, thereby, the uneven wear resistance performance is improved.

It is preferred that a distance (La) in the tire circumferential direction between the crown outer top portion (20a) and a toe-side end (20i) in the rotational direction (R) of the outer block edge 25A of the crown block 20 is in a range of from 30% to 45% of a length L1 of the crown block 20 in the tire circumferential direction. It is preferred that a distance (Lb) in the tire circumferential direction between the crown inner top portion (20b) and a heel-side end (20e) in the rotational direction (R) of the inner block edge 25B of the crown block 20 is in a range of from 30% to 45% of the length L1 of the crown block 20 in the tire circumferential direction. Thereby, the shearing strain is moderated in a heel-side portion and a toe-side portion in the rotational direction (R) of the crown block 20 to which large shearing force is applied upon contacting the ground, therefore, the deformation of the crown block 20, in other words, the deformation of the crown lateral grooves 6 is suppressed, thereby, the noise performance is improved.

It is preferred that the lengths L1 in the tire circumferential direction of the crown blocks 20 are larger than the widths H1 thereof in the tire axial direction. Thereby, the rigidity of the crown block 20 in the tire circumferential direction is maintained high, therefore, the deformation of the crown lateral grooves 6 is effectively suppressed.

In order to effectively exert the above effects, it is preferred that ratio L1/H1 of the lengths L1 in the tire circumferential direction and the widths H1 in the tire axial direction of the crown blocks 20 is in a range of from 1.2 to 1.55. It is preferred that the widths H1 of the crown blocks 20 in the tire axial direction are in a range of from 0.125 to 0.175 times the tread width (Tw).

As shown in FIG. 2, each of the crown blocks 20 includes a first block surface (20s) extending in the tire axial direction and located on the heel-side in the rotational direction (R) and a second block surface (20t) extending in the tire axial direction and located on the toe-side in the rotational direction (R). It is preferred that inclination angles θ1 of the first block surfaces (20s) are larger than inclination angles θ2 of the second block surfaces (20t). Thereby, it is possible that a large load applied to the first block surfaces (20s) during braking is released, thus, wear of the first block surfaces (20s) is suppressed, therefore, the uneven wear resistance performance is improved. In this specification, the inclination angle of each block surface is defined by an angle between an imaginary line 18 obtained by smoothly extending the block surface radially outwardly and a normal line 2n to the ground contacting surface (2a) at an intersection position of the block surface and the ground contacting surface (2a).

From a viewpoint of effectively exerting such effects, it is preferred that differences (θ1−θ2) between the inclination angles θ1 of the first block surfaces (20s) and the inclination angles θ2 of the second block surfaces (20t) are in a range of from 5 to 20 degrees.

It is preferred that the inclination angles θ1 of the first block surfaces (20s) are in a range of from 5 to 30 degrees. If the inclination angles θ1 of the first block surfaces (20s) are less than 5 degrees, it is possible that the above-described effects are not exerted. If the inclination angles θ1 of the first block surfaces (20s) are larger than 30 degrees, the rigidity of each of the crown blocks 20 of the crown land regions 10 on a side of the first block surface (20s) is decreased, therefore, it is possible that the pumping sound and the wear cannot be suppressed.

As shown in FIG. 6, each of the middle blocks 21 in this embodiment has a substantially hexagonal shape in plan view. Each of the middle blocks 21 in this embodiment includes an outer block edge 26A extending in the tire circumferential direction on the outer side in the tire axial direction and an inner block edge 26B extending in the tire circumferential direction on the inner side in the tire axial direction.

The outer block edge 26A has a central portion thereof in the tire circumferential direction protruding axially outwardly to form a middle outer top portion (21a). The inner block edge 26B has a central portion thereof in the tire circumferential direction protruding axially inwardly to form a middle inner top portion (21b).

The middle outer top portion (21a) and the middle inner top portion (21b) are displaced in the tire circumferential direction. Thereby, change of tire axial width H2 of the middle block 21 over the tire circumferential direction is decreased, therefore, rigidity difference in the tire circumferential direction of the middle block 21 is decreased, thereby, the uneven wear resistance performance is improved.

It is preferred that a distance (Lc) in the tire circumferential direction between the middle outer top portion (21a) and a toe-side end (21i) in the rotational direction (R) of the outer block edge 26A of the middle block 21 is in a range of from 30% to 45% of a length L2 of the middle block 21 in the tire circumferential direction. It is preferred that a distance (Ld) in the tire circumferential direction between the middle inner top portion (21b) and a heel-side end (21e) in the rotational direction (R) of the inner block edge 26B of the middle block 21 is in a range of from 30% to 45% of the length L2 of the middle block 21 in the tire circumferential direction.

It is preferred that the lengths L2 in the tire circumferential direction of the middle blocks 21 are larger than the widths H2 in the tire axial direction. Thereby, the rigidity of the middle blocks 21 in the tire circumferential direction is maintained high, therefore, the deformation of the middle lateral grooves 7 is effectively suppressed.

In order to effectively exert the above effects, ratio L2/H2 of the lengths L2 in the tire circumferential direction and the widths H2 in the tire axial direction of the middle blocks 21 is in a range of from 1.2 to 1.55. It is preferred that the widths H2 of the middle blocks 21 in the tire axial direction is in a range of from 0.125 to 0.175 times the tread width TW.

As shown in FIG. 4, each of the middle blocks 21 includes a first block surface (21s) located on the heel-side in the rotational direction (R) and a second block surface (21t) located on the toe-side in the rotational direction (R). It is preferred that inclination angles θ3 of the first block surfaces (21s) are larger than inclination angles θ4 of the second block surfaces (21t). Further, it is preferred that differences (θ3−θ4) between the inclination angles θ3 of the first block surfaces (21s) and the inclination angles θ4 of the second block surfaces (21t) are in a range of from 5 to 20 degrees.

It is preferred that the inclination angles θ3 of the first block surfaces (21s) are in a range of from 5 to 30 degrees. If the inclination angles θ3 of the first block surfaces (21s) are less than 5 degrees, a large load applied to the first block surfaces (10s) cannot be released and wear of the first block surfaces (21s) cannot be suppressed, therefore, it is possible that the uneven wear resistance performance cannot be improved. If the inclination angles θ3 of the first block surfaces (21s) are larger than 30 degrees, the rigidity of each of the middle blocks 21 of the middle land regions 11 on a side of the first block surface (21s) is decreased, therefore, it is possible that the pumping sound and the wear cannot be suppressed.

As shown in FIG. 6, each of the shoulder blocks 22 in this embodiment has a substantially pentagonal shape in plan view. Each of the shoulder blocks 22 in this embodiment includes an inner block edge 27A extending in the tire circumferential direction on the inner side in the tire axial direction and the inner block edge 27A has a central portion thereof in the tire circumferential direction protruding axially inwardly to form a shoulder inner top portion (22a). The shoulder blocks 22 configured as such disperse stress in the tire circumferential direction and moderate shearing strain with respect to the stress, therefore, they have high rigidity.

It is preferred that lengths L3 in the tire circumferential direction of the shoulder blocks 22 are larger than widths H3 thereof in the tire axial direction. It is preferred that ratio L3/H3 of the lengths L3 in the tire circumferential direction and the widths H3 in the tire axial direction of the shoulder blocks 22 is in a range of from 1.2 to 1.55. It is preferred that the widths H3 in the tire axial direction of the shoulder blocks 22 are in a range of from 0.125 to 0.175 times the tread width (Tw).

As shown in FIG. 5, each of the shoulder blocks 22 includes a first block surface (22s) located on the heel-side in the rotational direction (R) and a second block surface (22t) located on the toe-side in the rotational direction (R). It is preferred that inclination angles θ5 of the first block surfaces (22s) are larger than inclination angles θ6 of the second block surfaces (22t). Thereby, it is possible that a large load applied to the first block surfaces (22s) during braking is released, thus, wear of the first block surfaces (22s) is suppressed, therefore, the uneven wear resistance performance is improved.

From a viewpoint of effectively exerting such effects, it is preferred that differences (θ5−θ6) between the inclination angles θ5 of the first block surfaces (22s) and the inclination angles θ6 of the second block surfaces (22t) are in a range of from 5 to 20 degrees.

It is preferred that the inclination angles θ5 of the first block surfaces (22s) are in a range of from 5 to 30 degrees. If the inclination angles θ5 of the first block surfaces (22s) are less than 5 degrees, it is possible that the above-described effects are not exerted. If the inclination angles θ5 of the first block surfaces (22s) are larger than 30 degrees, the rigidity of each of the shoulder blocks 22 of the shoulder land regions 12 on a side of the first block surface (22s) is decreased, therefore, it is possible that the pumping sound and the wear cannot be suppressed.

While detailed description has been made of an embodiment of the present invention, the present invention can be embodied in various forms without being limited to the illustrated embodiment.

WORKING EXAMPLE (EXAMPLE)

Pneumatic tires for heavy duty of size 11R22.5 having the basic structure shown in FIG. 1 were made by way of test according to the specifications listed in Table 1. Each of the test tires was tested for the wet performance, the noise performance, and the uneven wear resistance performance. Test methods are as follows.
  Crown Tie Bar
  Db/D1: 90%
  Middle Block
  Lc/L2: 40%
  Ld/L2: 40%
<Wet Performance>

Each of the test tires was mounted on all wheels of a 2-D truck having a maximum load capacity of 10 tons under the following conditions. Then, a test driver drove the test truck on a wet asphalt road surface covered with 5 mm depth water of a test course, and the steering stability during driving on the wet road surface relating to steering response, rigid impression, grip and the like was evaluated by the driver's feeling. The results are indicated by an evaluation point based on reference 1 being 100, wherein a larger numerical value is better.
  Rim: 22.5×8.25
  Tire pressure: 720 kPa
<Noise Performance>

While a test driver drove the above-mentioned test truck on a dry asphalt road surface at a speed of 70 km/h, outside-car noise was measured. The results are indicated by an index using reciprocal numbers of the measured values based on the value of the reference 1 being 100, wherein the larger the numerical value, the smaller the outside-car noise is, which is good.

<Uneven Wear Resistance Performance>

A test driver drove the above-mentioned test car for 50,000 km. Then, differences were measured in wear amount between heel-side block edges and the toe-side block edges of the crown blocks, the middle blocks, and the shoulder blocks, respectively. The results are indicated by an index using reciprocal numbers of the measured values based on the value of the reference 1 being 100, wherein the larger the numerical value, the smaller the uneven wear is, which is good.

The test results are shown in Table 1.

TABLE 1

Figure 7:
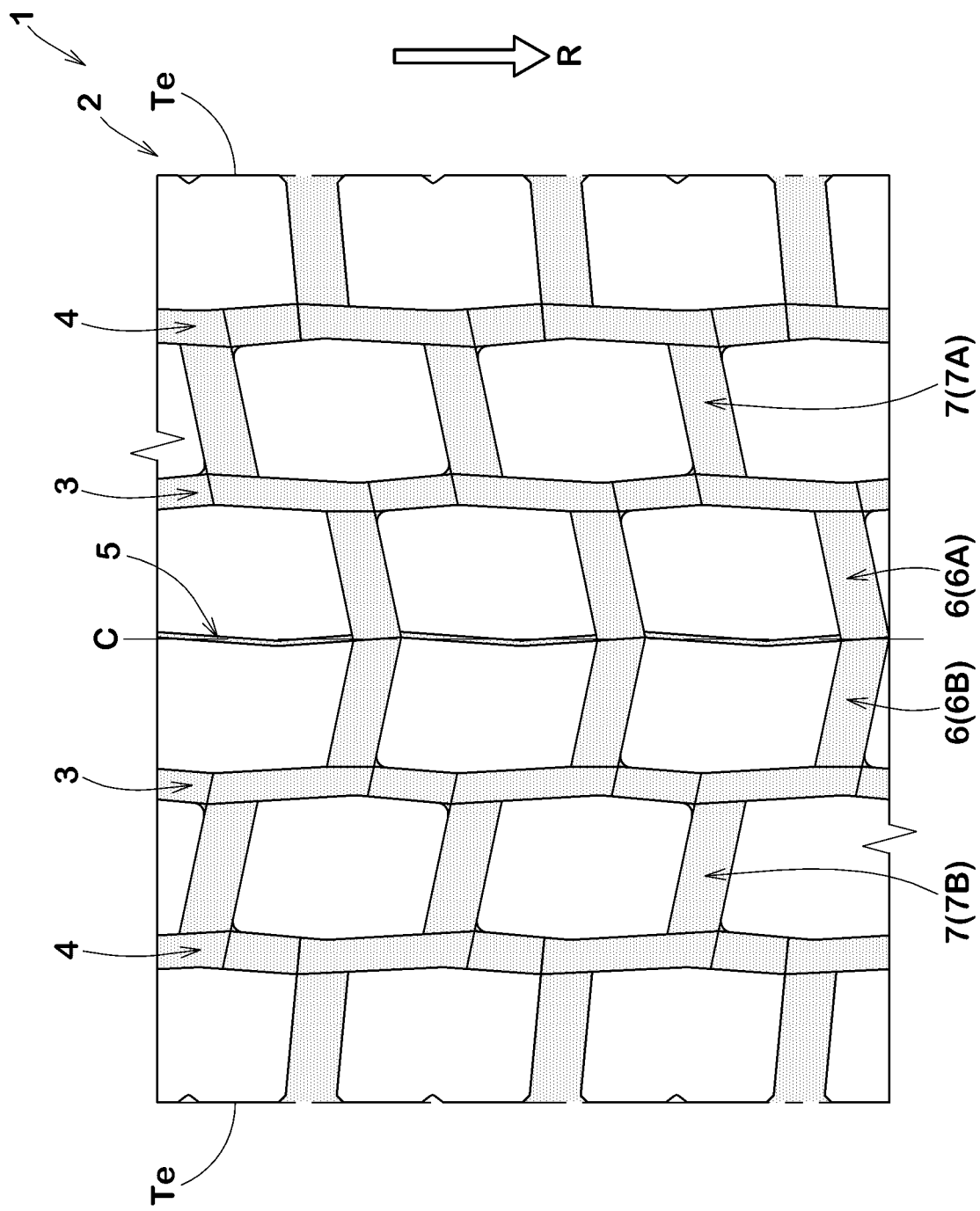
FIG. 7 is a development view of a tread portion of reference.

|  | Ref. 1 | Ex. 1 | Ref. 2 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|---|---|
| Figure showing configuration of Tread portion | FIG. 7 | FIG. 1 | FIG. 1 | FIG. 1 | FIG. 1 | FIG. 1 | FIG. 1 | FIG. 1 | FIG. 1 | FIG. 1 | FIG. 1 | FIG. 1 | FIG. 1 |
| Presence or absence of Crown tie bar | Absence | Presence | Absence | Presence | Presence | Presence | Presence | Presence | Presence | Presence | Presence | Presence | Presence |
| First depth Da/Second depth Db [%] | — | 60 | — | 40 | 45 | 75 | 80 | 60 | 60 | 60 | 60 | 60 | 60 |
| Presence or absence of Middle tie bar | Absence | Presence | Absence | Presence | Presence | Presence | Presence | Presence | Absence | Presence | Presence | Presence | Presence |
| Presence or absence of Shoulder tie bar | Absence | Presence | Absence | Presence | Presence | Presence | Presence | Absence | Presence | Presence | Presence | Presence | Presence |
| La/L1 and Lb/L1 [%] | 40 | 40 | 40 | 40 | 40 | 40 | 40 | 40 | 40 | 25 | 30 | 45 | 50 |
| Wet performance [Evaluation point: larger value is better] | 100 | 110 | 100 | 112 | 110 | 110 | 107 | 113 | 114 | 109 | 110 | 110 | 108 |

TABLE 1-continued

|  | Ref. 1 | Ex. 1 | Ref. 2 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|---|---|
| Noise performance [Index: larger value is better] | 100 | 120 | 105 | 118 | 120 | 120 | 121 | 116 | 117 | 118 | 120 | 120 | 117 |
| Uneven wear resistance performance [index: larger value is better] | 100 | 115 | 100 | 108 | 115 | 115 | 115 | 108 | 107 | 112 | 115 | 115 | 113 |

As is clear from Table 1, it can be confirmed that the wet performance, the noise performance, and the uneven wear resistance performance of the pneumatic tires as the examples are significantly improved as compared with the references.

The invention claimed is:

1. A tire comprising:
a tread portion provided with a first middle main groove extending continuously in a tire circumferential direction, a second middle main groove extending continuously in the tire circumferential direction, a crown longitudinal groove extending continuously in the tire circumferential direction and disposed between the first middle main groove and the second middle main groove, a plurality of first crown lateral grooves connecting between the crown longitudinal groove and the first middle main groove, and a plurality of second crown lateral grooves connecting between the crown longitudinal groove and the second middle main groove, wherein
the first crown lateral grooves and the second crown lateral grooves are arranged so as to be misaligned with each other in the tire circumferential direction,
the crown longitudinal groove is provided with at least one crown tie bar formed by raising a groove bottom of the crown longitudinal groove,
in a cross section taken along the tire circumferential direction of the crown longitudinal groove, one of circumferential edges of the crown tie bar extends so as to form a virtual linear line with a groove wall of one of the first crown lateral grooves or one of the second crown lateral grooves,
a rotational direction of the tire is specified,
the crown tie bar is provided with a heel-side edge including a heel-side end in the rotational direction and extending outwardly in a tire radial direction from a groove bottom of the crown longitudinal groove, and a toe-side edge including a toe-side end in a direction opposite to the rotational direction and extending radially outwardly from the groove bottom of the crown longitudinal groove,
an inclination angle with respect to the tire radial outward direction of the heel-side edge is greater than an inclination angle with respect to the tire radial outward direction of the toe-side edge,
the inclination angle of the heel-side edge is in a range of from 10 to 30 degrees,
the inclination angle of the toe-side edge is in a range of from 5 to 20 degrees,
the at least one crown tie bar is disposed between a connecting position of one of the first crown lateral grooves with the crown longitudinal groove and a connecting position of an adjacent one of the second crown lateral grooves with the crown longitudinal groove, and
no crown tie bar is disposed at the connecting positions of the first crown lateral grooves with the crown longitudinal groove and the connecting positions of the second crown lateral grooves with the crown longitudinal groove.

2. The tire according to claim 1, wherein the first crown lateral grooves and the second crown lateral grooves are arranged with same pitches and shifted by half-pitches in the tire circumferential direction.

3. The tire according to claim 1, wherein the at least one crown tie bar includes a first crown tie bar having a first depth and a second crown tie bar having a second depth greater than the first depth of the first crown tie bar.

4. The tire according to claim 3, wherein
the at least one crown tie bar includes a plurality of the first crown tie bars and a plurality of the second crown tie bars, and
the first crown tie bars and the second crown tie bars are arranged alternately in the tire circumferential direction.

5. The tire according to claim 4, wherein
the at least one crown tie bar has a flat top surface extending parallel to a ground contacting surface of the tire,
the first depth is a radial distance between the ground contacting surface and the top surface of the first crown tie bar, and
the second depth is a radial distance between the ground contacting surface and the top surface of the second crown tie bar.

6. The tire according to claim 4, wherein
the crown longitudinal groove extends in a zigzag shape such that first inclined elements and second inclined elements are arranged alternately in the tire circumferential direction,
the first inclined elements are inclined to one side with respect to the tire circumferential direction,
the second inclined elements are inclined to the other side with respect to the tire circumferential direction,
a pair of the first crown tie bar and the second crown tie bar is disposed in each of the first inclined elements and the second inclined elements,
the first crown tie bars and the second crown tie bars disposed in the first inclined elements are inclined to a same side as the first inclined elements with respect to the tire circumferential direction, and
the first crown tie bars and the second crown tie bars disposed in the second inclined elements are inclined to a same side as the second inclined elements with respect to the tire circumferential direction.

7. The tire according to claim 1, wherein the first middle main groove and the second middle main groove are provided with middle tie bars formed by raising groove bottoms of the first middle main groove and the second middle main groove,
- the tread portion is provided with a first shoulder main groove extending continuously in the tire circumferential direction on the outer side in a tire axial direction of the first middle main groove and a plurality of first middle lateral grooves connecting between the first shoulder main groove and the first middle main groove, and
- each of the middle tie bars of the first middle main groove is disposed between a connecting position of one of the first crown lateral grooves with the first middle main groove and a connecting position of an adjacent one of the first middle lateral grooves with the first middle main groove.

8. The tire according to claim 7, wherein
- the tread portion is provided with a second shoulder main groove extending continuously in the tire circumferential direction on the outer side in the tire axial direction of the second middle main groove, and
- the first shoulder main groove and the second shoulder main groove are provided with shoulder tie bars formed by raising groove bottoms of the first shoulder main groove and the second shoulder main groove.

9. The tire according to claim 8, wherein
- the tread portion is provided with a plurality of first shoulder lateral grooves connecting between the first shoulder main groove and one of tread edges adjacent thereto, and
- each of the shoulder tie bars of the first shoulder main groove is disposed between a connecting position of one of the first middle lateral grooves with the first shoulder main groove and a connecting position of an adjacent one of the first shoulder lateral grooves with the first shoulder main groove.

10. The tire according to claim 9, wherein no shoulder tie bar is disposed at the connecting positions of the first middle lateral grooves with the first shoulder main groove and the first shoulder lateral grooves with the first shoulder main groove.

11. The tire according to claim 7, wherein
- a rotational direction of the tire is specified, and
- the middle tie bars are each formed over an entire length of a portion of the first middle main groove between one of the crown lateral grooves and its adjacent one of the first middle lateral grooves on a heel-side in the rotational direction.

12. The tire according to claim 7, wherein
- the tread portion is provided with a second shoulder main groove extending continuously in the tire circumferential direction on the outer side in the tire axial direction of the second middle main groove and a plurality of second middle lateral grooves connecting between the second shoulder main groove and the second middle main groove, and
- the first middle lateral grooves are inclined in opposite directions to the second middle lateral grooves with respect to the tire axial direction.

13. The tire according to claim 12, wherein both groove edges of each of the first middle lateral grooves and the second middle lateral grooves extend linearly over their entire lengths.

14. The tire according to claim 7, wherein
- no middle tie bar is disposed at the connecting positions of the first crown lateral grooves with the first middle main groove and the connecting positions of the first middle lateral grooves with the first middle main groove.

15. The tire according to claim 1, wherein
- the first crown lateral grooves and the second crown lateral grooves extend straight, and
- the first crown lateral grooves are inclined in opposite directions to the second crown lateral grooves with respect to the tire axial direction.

16. The tire according to claim 1, wherein
- the crown longitudinal groove extends in a zigzag shape, and
- no crown tie bar is disposed in bent portions of the zigzag shape.

17. The tire according to claim 1, wherein the first middle main groove extends in a zigzag shape in the tire circumferential direction.

* * * * *